US012703359B2

(12) United States Patent
Hermann et al.

(10) Patent No.: US 12,703,359 B2
(45) Date of Patent: Aug. 11, 2026

(54) COMPUTER-IMPLEMENTED METHOD FOR EXPANSION OF SWARM DATA, DATA PROCESSING DEVICE, COMPUTER-READABLE STORAGE MEDIUM, DRIVER ASSIST SYSTEM AND MOTOR VEHICLE

(71) Applicants: CARIAD SE, Wolfsburg (DE); Volkswagen Aktiengesellschaft, Wolfsburg (DE)

(72) Inventors: Bastian Hermann, Berlin (DE); Daniel Münning, Braunschweig (DE)

(73) Assignees: Cariad SE, Wolfsburg (DE); Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 18/401,055

(22) Filed: Dec. 29, 2023

(65) Prior Publication Data

US 2024/0239338 A1 Jul. 18, 2024

(30) Foreign Application Priority Data

Jan. 16, 2023 (DE) ........................ 102023100899.4

(51) Int. Cl.
*B60W 30/12* (2020.01)

(52) U.S. Cl.
CPC ......... *B60W 30/12* (2013.01); *B60W 2510/20* (2013.01); *B60W 2552/50* (2020.02); *B60W 2552/53* (2020.02)

(58) Field of Classification Search
CPC ............. B60W 30/12; B60W 2510/20; B60W 2552/50; B60W 2552/53; B60W 40/06; B60W 30/18163; B60W 2420/54; B60W 2556/45
See application file for complete search history.

(56) References Cited

U.S. PATENT DOCUMENTS 11,118,933 B2 * 9/2021 Eigel .................. G01C 21/3691
2019/0353498 A1 * 11/2019 Eigel .................... B62D 15/026
2020/0133307 A1 * 4/2020 Kelkar ..................... G08G 1/22
(Continued)

FOREIGN PATENT DOCUMENTS

DE 102013019112 A1 5/2015
DE 102016209515 A1 12/2017
(Continued)

*Primary Examiner* — Joseph J Dallo
(74) *Attorney, Agent, or Firm* — Seed Intellectual Property Law Group LLP

(57) ABSTRACT

The disclosure relates to a computer-implemented method of expanding swarm data for controlling a motor vehicle by way of a driver assist system, wherein the swarm data for a route section include corresponding indicator swarm data regarding a course of at least two roadway or lane indicators on the route section, and wherein the swarm data are provided by registered roadway or lane indicator data. The method includes calculating, from the indicator swarm data, a minimum indicator swarm distance regarding the at least two roadway or lane indicators at one or more route section positions of the route section, and expanding the indicator swarm data regarding at least one of the at least two roadway or lane indicators with the indicator swarm distance at the one or more route section positions.

9 Claims, 2 Drawing Sheets

(56) References Cited

U.S. PATENT DOCUMENTS

2020/0312155 A1* 10/2020 Kelkar ................ B60W 60/005
2022/0156432 A1* 5/2022 Best ........................ G06F 30/20

FOREIGN PATENT DOCUMENTS

DE 102020213496 A1 * 4/2022
DE 102021208245 A1 * 2/2023 ............ B60W 30/12
WO WO-2023227377 A1 * 11/2023 .......... B60W 50/082

* cited by examiner

COMPUTER-IMPLEMENTED METHOD FOR EXPANSION OF SWARM DATA, DATA PROCESSING DEVICE, COMPUTER-READABLE STORAGE MEDIUM, DRIVER ASSIST SYSTEM AND MOTOR VEHICLE

BACKGROUND

Technical Field

The disclosure relates to a computer-implemented method for expansion of swarm data. The disclosure further relates to a data processing device, a computer-readable storage medium, a driver assist system, and a motor vehicle.

Description of the Related Art

A lane change can be initiated by a driver in a cross-guiding assist system, although this may be difficult in an emergency situation. Therefore, an "emergency assist" in motor vehicles may require knowledge as to how wide the hard shoulder is on a freeway, for example, in order to provide a safe stopping of the motor vehicle on it (hard shoulder lane change). The exact calculation of the minimum lane width, e.g., that of the hard shoulder, by way of a camera of the motor vehicle may, however, be complicated, on account of the computing time required to identify this. In particular, the determination of the lane width of a hard shoulder by way of the camera may be complex on tight curves or in winding road situations with a necessary looking ahead.

DE 10 2016 209 515 A1 and DE 10 2020 213 496 A1 are the prior art.

BRIEF SUMMARY

Embodiments of the present disclosure provide improved swarm databased steering of a motor vehicle by way of a driver assist system.

More particularly, embodiments of the present disclosure provide a computer-implemented method for the expanding of swarm data. A data processing device a computer-readable storage medium, a driver assist system and a motor vehicle are also provided.

According to one aspect, a computer-implemented method is provided for expanding of swarm data for controlling or automated driving of a motor vehicle by way of a driver assist system, wherein the swarm data for a route section include corresponding indicator swarm data regarding a course of at least two roadway and/or lane indicators on the route section, which are obtainable or provided by registering the roadway and/or lane indicator data by way of a plurality of motor vehicles as they travel on the respective route section, the method involving:

a) calculating from the indicator swarm data a minimum indicator swarm distance regarding the at least two roadway and/or lane indicators at least at one route section position of the route section; and
b) expanding the indicator swarm data regarding at least one of the at least two roadway and/or lane indicators with the calculated indicator swarm distance at the at least one route section position.

Thus, the computed width or the computed minimum indicator swarm distance is provided as a further component of the indicator swarm data for retrieval by driver assist functions of automatically driven vehicles.

Thus, in the present disclosure, a hard shoulder lane change can be enabled or activated by an emergency assist when the drivable area of the hard shoulder is broader than the vehicle plus a given safety distance. The computation of lane widths, e.g., in the form of the minimum indicator swarm distance, can occur advantageously in a backend and the computed lane width can be saves as an attribute in the so-called swarm data. The present disclosure can thus improve the availability of driver assist systems, especially emergency assist systems. Thus, aborting of driver assist processes can be prevented and the safety can be enhanced. Depending on the activation state (activate if available lane width greater than the described limit value, otherwise not), the lane change will thus be activated for the assist function (such as emergency assist) or not. If the lane change is activated, the assist function can include the lane change as an option in the maneuver planning, otherwise not.

A further benefit of the present disclosure can be the early recognition of traffic jams, especially for upcoming route sections, e.g., at a distance of 50 m to 5 m, which can then also be considered by the driver assist function in the maneuver planning. The expanding of swarm data with a computed lane width can be done not only for the hard shoulder, but also optionally for all lanes of a roadway. Data transmission costs can be kept to a minimum by optional restriction to a pure hard shoulder width in right-hand traffic on the right side and in left-hand traffic on the left side.

The roadway and/or lane width can also be utilized for automated parking processes, since it can correspond to the distance from the curb. Moreover, the present disclosure improves the view of a parking space when this is difficult for live recognition by a camera.

Preferably, the computed indicator swarm distance at the at least one route section position relates to adjacent roadway and/or lane indicators and/or an outermost roadway and/or lane indicator and the roadway and/or lane indicator located closest to it.

Preferably, the indicator swarm distance corresponds to or is interpreted as being or is signaled as being a swarm roadway and/or swarm lane width, especially a hard shoulder swarm width.

Preferably, the method further involves:

c1) comparing the computed indicator swarm distance at a first route section position to the computed indicator swarm distance at a second route section position; and
c2) expanding the indicator swarm data in dependence on the (result of this) comparison.

Preferably, the indicator swarm data are expanded when a change in the indicator swarm distance from the first route section position to the second route section position is above and/or below a given threshold value.

Preferably, the indicator swarm data pertain to lane markings, edge fortifications, guardrails or the like as the roadway and/or lane indicators.

For application instances or situations which may arise during the method and which are not explicitly described here, it can be provided that an error message and/or a request to enter a user feedback will be output according to the method and/or a standard setting and/or a predetermined initial state will be established.

According to a further aspect, the disclosure provides a data processing device, comprising hardware that performs the method according to one of the preceding embodiments.

The disclosure also includes the data processing device or a processor device, which is adapted to carry out one embodiment of the method according to the disclosure. For this, the processor device may comprise at least one microprocessor and/or at least one microcontroller and/or at least one FPGA (field programmable gate array) and/or at least one DSP (digital signal processor).

Advantageously, the expanding of the indicator swarm data is done by way of a remote data processing device. The expanded indicator swarm data can thus be provided to an entire fleet of motor vehicles. But the data processing device itself can also be found in the motor vehicle.

Preferably, the data processing device for providing the expanded indicator swarm data to a driver assist system is adapted to control a motor vehicle.

The disclosure also includes modifications of the data processing device according to the disclosure, having features as have already been described in connection with the modifications of the method according to the disclosure. For this reason, the corresponding modifications of the data processing device according to the disclosure will not be described here once more.

According to a further aspect, the invention creates a computer program, containing commands which, when the program is executed by a computer, cause it to perform the method according to one of the preceding embodiments.

Furthermore, the processor device may contain program code which is adapted to carry out the embodiment of the method according to the disclosure when executed by the processor device. The program code can be stored in a data storage of the processor device. The processor device can comprise, e.g., at least one circuit board and/or at least one SoC (system on chip).

According to a further aspect, the disclosure creates a computer-readable storage medium, on which the computer program according is stored.

As a further solution, the disclosure also encompasses a computer-readable storage containing program code which, when the program is executed by a processor circuit of a computer or a computer cluster, cause it to perform an embodiment of the method according to the disclosure. The storage medium can be provided, e.g., at least partly as a nonvolatile data storage (such as a flash memory and/or as a SSD—solid state drive) and/or at least partly as a volatile data storage (e.g., as a RAM—random access memory). The storage medium can be arranged in the processor circuit in its data storage. But the storage medium can also be operated, for example, as a so-called appstore server on the Internet. A processor circuit with at least one microprocessor can be provided by the computer or the computer cluster. The program code can be provided as binary code or Assembler and/or as source code of a programming language (such as C) and/or as a program script (such as Python).

According to a further aspect, the disclosure provides a driver assist system for control of a motor vehicle when driving on a route section with the use of swarm data for the route section, wherein the swarm data for the route section encompass corresponding indicator swarm data regarding a course of at least two roadway and/or lane indicators of the route section, wherein the driver assist system for control of the motor vehicle is designed to use corresponding expanded indicator swarm data with an indicator swarm distance regarding at least one of the at least two roadway and/or lane indicators at least at one route section position of the route section. In this way, for example, the activation of a specified driving mode can be controlled, in that the activation only occurs if a value of the indicator swarm distance is greater than a threshold value. This can be provided for a driving mode which calls for an emergency stopping as one possible fallback maneuver (e.g., if the driver is not ready to take over control and the driving mode needs to be ended.

The disclosure also includes the driver assist system for a motor vehicle. The driver assist system may have a data processing device or a processor device, which is adapted to process the expanded indicator swarm data regarding at least one roadway and/or lane indicator. For this, the processor device may comprise at least one microprocessor and/or at least one microcontroller and/or at least one FPGA (field programmable gate array) and/or at least one DSP (digital signal processor). Furthermore, the processor device may contain program code which is adapted to process the expanded indicator swarm data regarding at least one roadway and/or lane indicator when executed by the processor device. The program code can be stored in a data storage of the processor device. The processor circuit of the processor device can comprise, e.g., at least one circuit board and/or at least one SoC (system on chip).

According to a further aspect, the disclosure provides a motor vehicle, comprising the driver assist system and is capable of registering roadway and/or lane indicator data.

The motor vehicle according to the disclosure is advantageously configured as an automobile, especially a passenger car or a truck, or as a passenger bus or motorcycle.

The disclosure also encompasses the combinations of the features of the described embodiments. Thus, the disclosure also encompasses realizations having a combination of the features of several of the described embodiments, as long as the embodiments were not described as being mutually exclusive.

BRIEF DESCRIPTION OF THE SEVERAL VIEWS OF THE DRAWINGS

In the following, exemplary embodiments of the disclosure shall be described.

DETAILED DESCRIPTION

In the exemplary embodiments, the described components of the embodiments each time constitute single features of the disclosure to be viewed independently of each other, which also modify the disclosure independently of each other. Therefore, the disclosure will also encompass combinations of features other than the ones shown. Moreover, the described embodiments can also be supplemented by other than the already described features of the disclosure.

In the figures, the same reference numbers each time denote functionally equal elements.

Figure 1:
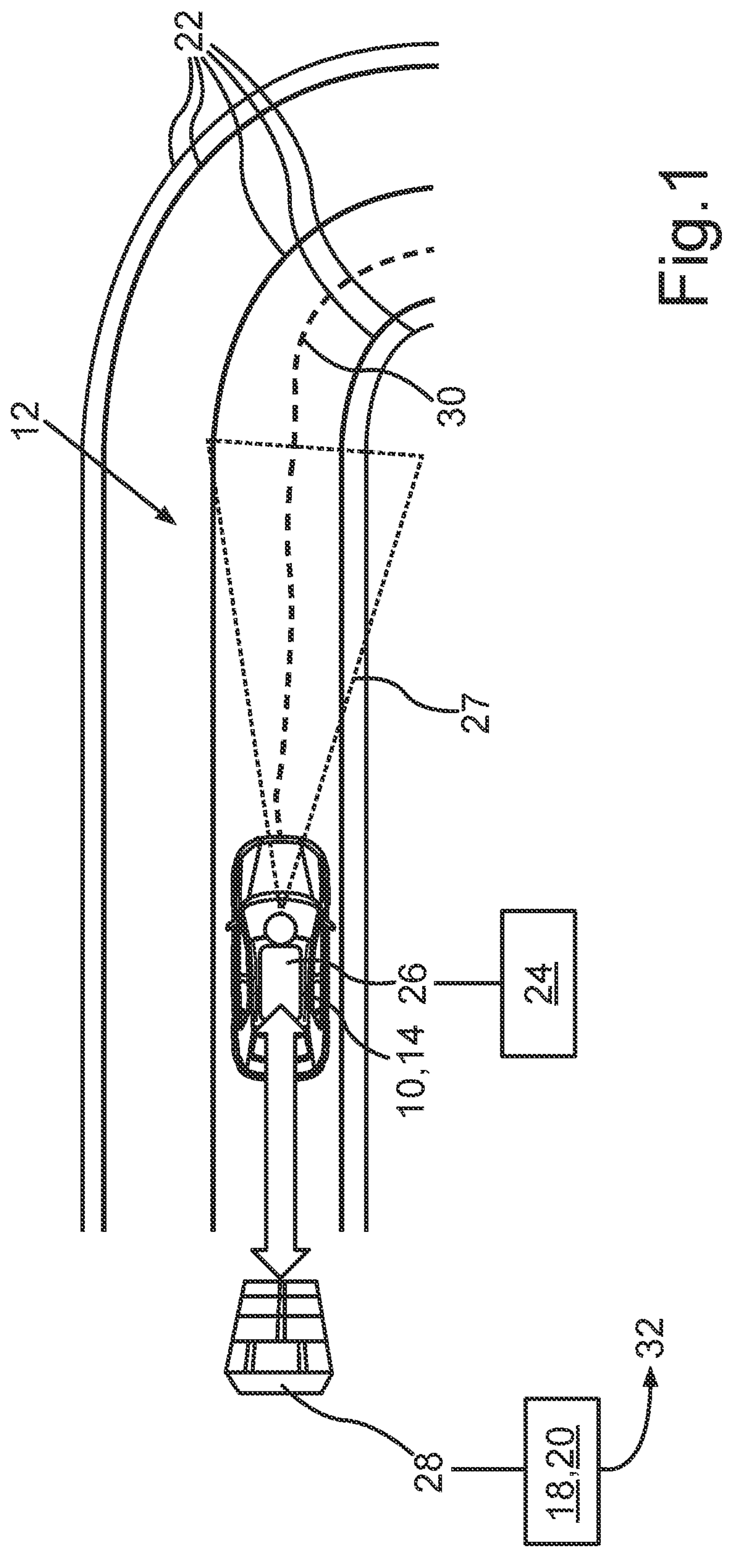
FIG. 1 shows a schematic representation of one embodiment of a motor vehicle driving along a route section.

FIG. 1 shows an embodiment of a motor vehicle 10 driving along a route section 12.

The motor vehicle 10 comprises a driver assist system 14, which can control or automatically steer the motor vehicle 10 when driving along the route section 12. The driver assist system 14 is designed to steer the motor vehicle 10 while driving along the route section 12 making use of swarm data 18 for the route section 12.

The swarm data 18 include indicator swarm data 20. The indicator swarm data 20 pertain to a course of the roadway and/or lane indicators 22 on the route section 12. The roadway and/or lane indicator 22 can be, for example, a lane marking, an edge fortification, or a guardrail.

The indicator swarm data 20 are obtainable by registering of roadway and/or lane indicator data 24 by way of a multitude of motor vehicles 10 respectively driving along the route section 12. For this, the multitude of motor vehicles 10 can each comprise at least one sensor device 26 with a sensor viewing field 27, such as a camera, a radar, an ultrasound sensor or the like.

The motor vehicles 10 each send the registered roadway and/or lane indicator data 24 for the route section 12 to a remote (offboard and/or stationary) data processing device 28. The remote data processing device 28 receives the respectively registered roadway and/or lane indicator data 24 for the route section 12.

The remote data processing device 28 can aggregate the roadway and/or lane indicator data 24 of the motor vehicles 10, for example, add them with weighting or form an average, in order to establish the indicator swarm data 20. In this way, the courses of a plurality or multitude of roadway and/or lane indicators 22 as indicated for example in FIG. 1 are obtained.

The swarm data 18 may also include further swarm data, such as driving swarm data. The driving swarm data include, for example, a swarm trajectory 30, which is obtainable by registering of driving data by way of the multitude of motor vehicles 10 respectively driving along the route section 12.

Figure 2:
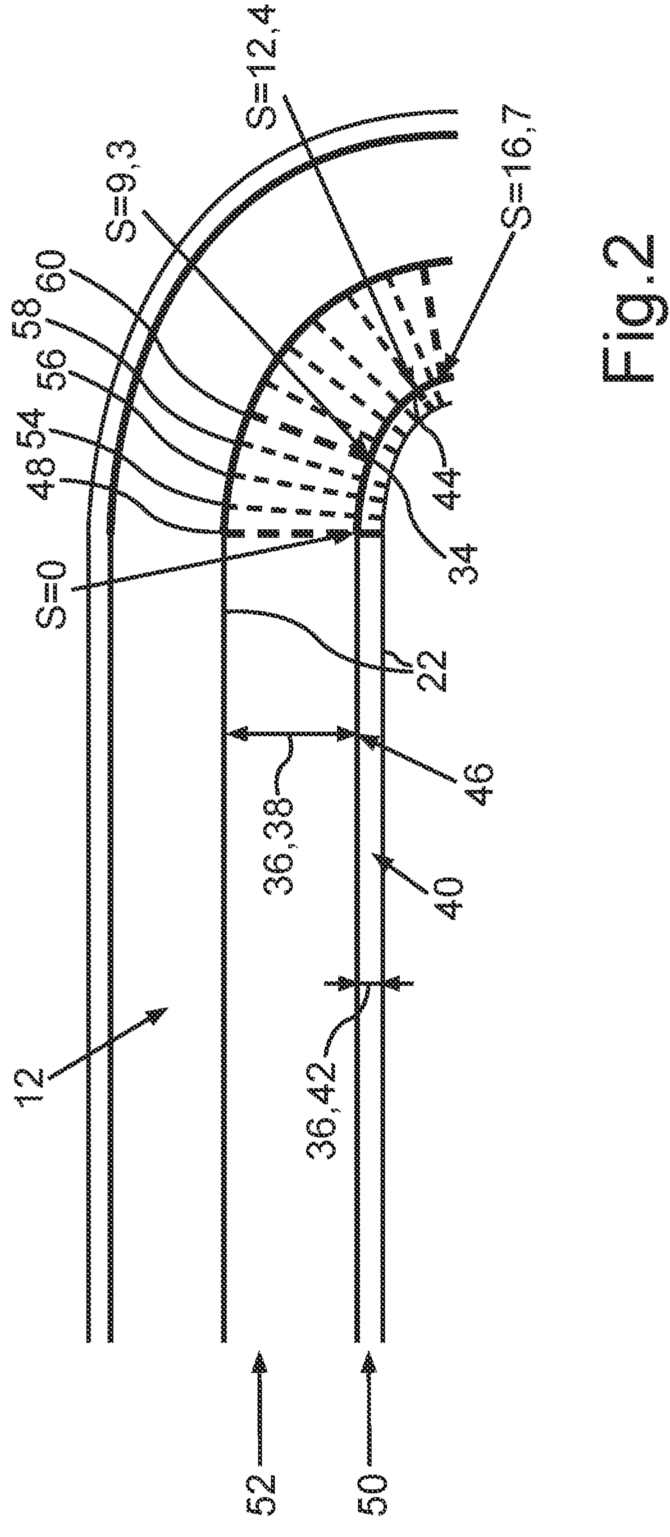
FIG. 2 shows a schematic representation of the route section of FIG. 1 with dimensions such as are determined in one embodiment of the method.

FIG. 2 shows once more the route section 12 of FIG. 1.

The driver assist system 14 is additionally designed to steer the motor vehicle 10 when driving along the route section 12 with the use of expanded indicator swarm data 32 for the route section 12.

As previously mentioned, the indicator swarm data 32 pertain to the course of a roadway and/or lane indicator 22 on the route section 12. The indicator swarm data 20 are obtainable, as previously described, by way of the multitude of motor vehicles 10 respectively driving along the route section 12.

From the indicator swarm data 20 regarding the course of two roadway and/or lane indicators 22, the data processing device 28 can additionally compute a minimum indicator swarm distance 36 regarding the two roadway and/or lane indicators 22 at a route section position 34 of the route section 12. Advantageously, the indicator swarm distance 36 pertains to adjacent roadway and/or lane indicators 22. It is likewise advantageous for the indicator swarm distance 36 to pertain to an outermost roadway and/or lane indicator 22 and a roadway and/or lane indicator 22 closest to this. Thus, a swarm roadway and/or swarm lane width 38 can be calculated. For example, in the case of right-hand traffic, the indicator swarm distance 36 can pertain to the outermost right-hand roadway and/or lane indicator 22 and the one situated to the left of it. Thus, a hard shoulder swarm width 42 can be calculated on freeways with a hard shoulder 40.

The indicator swarm data 20 regarding the two roadway and/or lane indicators 22 (or at least one of them) can be expanded with the computed indicator swarm distance 36. For this, the data processing device 28 can compute the indicator swarm distance 36 at one route section position 34 and expand the indicator swarm data 20 regarding the two roadway and/or lane indicators 22 with the indicator swarm distance 36 at the route section position 34. The data processing device 28 can then compute the indicator swarm distance 20 at a following further route section position 44 on the route section 12. The computed indicator swarm distances 36 are then compared to each other. Depending on the comparison, the data processing device 28 can expand the indicator swarm data 20 regarding the two roadway and/or lane indicators 22 with the indicator swarm distance 36 at the further route section position 44. If the indicator swarm distance 36 changes in magnitude from the route section position 34 to the further route section position 44, for example, by more than a threshold value, the data processing device 28 can expand the indicator swarm data 20 regarding the two roadway and/or lane indicators 22 with the indicator swarm distance 36 at the further route section position 44. If the change in magnitude of the indicator swarm distance 36 from the route section position 34 to the further route section position 44 remains below the threshold value, the expanding of the indicator swarm data 20 regarding the two roadway and/or lane indicators 22 at the further route section position 44 need not be done.

An example of this expansion method is indicated in FIG. 2. The indicator swarm data 20 regarding a selected roadway and/or lane indicator 46 at a first route section position 48 are at first expanded with the indicator swarm distance 36 regarding a roadway and/or lane indicator 22 closest to a first side 50 and regarding a roadway and/or lane indicator 22 closest to a second side 52. From the first route section position 48 to a second route section position 54 there occurs a change in the indicator swarm distance 36 regarding the roadway and/or lane indicator 22 closest to the first side 50 and regarding the roadway and/or lane indicator 22 closest to the second side 52, each time below the threshold value. Thus, the indicator swarm data 20 regarding the selected roadway and/or lane indicator 46 are not expanded with the indicator swarm distances 36 at the second route section position 54. The same holds for the change in the indicator swarm distances 36 from the second route section position 54 to a third route section position 56 and from the third route section position 56 to a fourth route section position 58. From the fourth route section position 58 to a fifth route section position 60 the change in magnitude of the indicator swarm distance 36 regarding the roadway and/or lane indicator 22 closest to the second side 52 is above the threshold value and the change in magnitude of the indicator swarm distance 36 regarding the roadway and/or lane indicator 22 closest to the first side 50 is below the threshold value. Thus, the indicator swarm data 20 regarding the selected roadway and/or lane indicator 46 will be expanded with the indicator swarm distance 36 regarding the roadway and/or lane indicators 22 closest to the second side 52 at the fifth route section position 60. This process can be continued along the route section 12. The step length between two route section positions 34 can be suitably chosen.

One example of the expanded indicator swarm data 32 regarding the selected roadway and/or lane indicator 46 can be as follows:

```
"laneMarks": [
  {
    "id": 34053123,
    „start": {
        "X" : −87469.7421875,
        "Y": −17481.666015625,
        "Z": 464382.96875
      },
    „end": {
        "X": −87459.235322,
        "Y": −17461.623535,
        "Z": 464381.5664235
      },
    „polynomials": {
        „c0": −1.23863,
        „c1": −5.325529,
        „c2": 2.95448
      },
```

-continued

```
"laneWidth": [
  {
    "s": 0.0,
    "d": "2.0"
  },
  {
    "s": 0.0,
    "d" : "-3.5"
  },
  {
    "s": 9.3,
    "d": „-3.6"
  },
  {
    "s": 12.4,
    "d": „1.9"
  },
  {
    "s": 16.7,
    "d": "-3.7"
  },
  {
  "laneMarkType": "SOLID"
  },
 ],
}
```

The variable "id" represents an identifier for the selected roadway and/or lane indicator 46. The variables "start" and "end" pertain respectively to the route section position 34 of a beginning and end of the route section 12. The variables "polynomials" pertain to the course of the selected roadway and/or lane indicator 46. The variable "lane Width" indicates the swarm roadway or swarm lane width 38. The variable "S" indicates the route section position 34 and the variable "d" the calculated indicator swarm distance 36 at the corresponding route section position 34.

At a position "S=0", the calculated indicator swarm distance 36 regarding the roadway and/or lane indicator 22 closest to the first side 50 is for example "d=2.0" (meters) and regarding the roadway and/or lane indicator 22 closest to the second side 52 it is "d=−3.5" (meters). The threshold value here is for example 0.1 (meters).

At a position "S=9.3", the calculated indicator swarm distance 36 regarding the roadway and/or lane indicator 22 closest to the second side 52 is for example "d=−3.6" (meters). The change in magnitude of the indicator distance 36 regarding the roadway and/or lane indicator 22 closest to the first side 50 is below the threshold value. Thus, the indicator swarm data 20 will not be expanded with the indicator swarm distance 36 regarding the roadway and/or lane indicator 22 closest to the first side 50.

At a position "S=12.4", the calculated indicator swarm distance 36 regarding the roadway and/or lane indicator 22 closest to the first side 50 is for example "d=1.9" (meters). The change in magnitude of the indicator distance 36 regarding the roadway and/or lane indicator 22 closest to the second side 52 is below the threshold value. Thus, the indicator swarm data 20 will not be expanded with the indicator swarm distance 36 regarding the roadway and/or lane indicator 22 closest to the second side 52.

At a position "S=16.7", the calculated indicator swarm distance 36 regarding the roadway and/or lane indicator 22 closest to the second side 52 is for example "d=−3.7" (meters). The change in magnitude of the indicator distance 36 regarding the roadway and/or lane indicator 22 closest to the first side 50 is below a threshold value. Thus, the indicator swarm data 20 will not be expanded with the indicator swarm distance 36 regarding the roadway and/or lane indicator 22 closest to the first side 50.

The idea also includes the data processing device 28 and a computer program (not shown), containing commands which, when the program is executed by a computer, causes it to perform the described method. Moreover, the idea includes a computer-readable storage medium (not shown), on which the computer program is stored. Moreover, the idea includes the driver assist system 14 and the motor vehicle 10.

One idea for advantageous embodiments is the expanding of the swarm data with a hard shoulder width, for purposes of a storage optimal design.

Thus, a principle of advantageous embodiments can be described as follows:

A protocol can be stored and optimally expanded to provide an emergency assist with an exact and sufficiently forward-looking hard shoulder width.

As compared to the use of a pure HD map, the optical localization and providing of the swarm data can be more precise, more timely (thanks to constant updates of the swarm) and more favorably, since no DGPS is needed for a highly precise localization.

The backend typically aggregates the data registered for the lane markings. A calculation of the lane widths will additionally be done preferably in the present idea.

In this case, it is possible to calculate a minimum distance of a lane marking from the next lane marking/road edge/guardrail at the start of a segment. This distance will be included as d0 in the attributes of the lane marking in advantageous embodiments.

The minimum distance to the next lane marking/road edge/guardrail along the lane marking in question will be calculated preferably with slight step width. Upon change of, for example, 10 cm ($d_x - d_{x-1}$=+10 cm), a new lane width ($d_x$) will preferably be started and added to the attributes of the lane marking with the position. This processing might not be done within the camera on account of the limited computer time and lack of viewing range of the live detection.

In advantageous embodiments of the idea, a new output of the lane marking with the lane width occurs in the form:

lane marking:
{ID, start, end, curvature, ..., lane widths [a0, a1, ..., ax]},
where each time a: {position on the vehicle's lane marking: S, distance: d}.

On freeways in right-hand traffic, the right lane boundary of the right-hand lane can be given a new attribute in this way, namely, the distance to the road edge/line/guardrail (i.e., the minimum distance, which is calculated in the backend).

In left-hand traffic, the attribute can be assigned to the left-hand lane boundary.

Thanks to the application-specific expansion to the pure hard shoulder width, no unnecessary data will be uploaded or downloaded preferably in the backend and also no unnecessary calculations will be performed preferably in the backend for lane widths involving all the lines.

The lane width calculated in the backend is preferably assigned to the line as an attribute.

On the whole, the examples show how a method for improving a transverse steering assist system can be provided by the expansion of swarm data.

German patent application no. 102023100899.4, filed Jan. 16, 2023, to which this application claims priority, is hereby incorporated herein by reference in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A computer-implemented method of expanding swarm data for controlling a motor vehicle by way of a driver assist system, wherein the swarm data for a route section of a road include corresponding indicator swarm data regarding a course of at least two roadway or lane indicators on the route section, and wherein the swarm data are provided by registered roadway or lane indicator data, the method comprising:

calculating, from the indicator swarm data, a minimum indicator swarm distance between the at least two roadway or lane indicators at one or more route section positions of the route section;

obtaining expanded indicator swarm data by adding to the indicator swarm data a lane width value corresponding to the minimum indicator swarm distance at the one or more route section positions of the route section, wherein, for each route section position of the one or more route section positions of the route section, the expanded indicator swarm data includes an identifier of the route section position and the lane width value corresponding to the minimum indicator swarm distance between the at least two roadway or lane indicators calculated for the route section position;

providing the expanded indicator swarm data to the driver assist system; and controlling the motor vehicle by the driver assist system based on the lane width value corresponding to the minimum indicator swarm distance between the at least two roadway or lane indicators calculated for at least one of the one or more route section positions included in the expanded indicator swarm data.

2. The method according to claim 1, wherein the minimum indicator swarm distance at the one or more route section positions relates to adjacent roadway or lane indicators or an outermost roadway or lane indicator and the roadway or lane indicator located closest to the adjacent roadway or lane indicators or the outermost roadway.

3. The method according to claim 1, further comprising:

comparing a first indicator swarm distance at a first route section position to a second indicator swarm distance at a second route section position; and expanding the indicator swarm data based on the comparing.

4. The method according to claim 1, wherein the indicator swarm data pertain to lane markings, edge fortifications, or guardrails as the roadway or lane indicators.

5. A data processing device that expands swarm data for controlling a motor vehicle by way of a driver assist system, wherein the swarm data for a route section of a road include corresponding indicator swarm data regarding a course of at least two roadway or lane indicators on the route section, and wherein the swarm data are provided by registered roadway or lane indicator data, the data processing device comprising:

at least one processor; and at least one memory storing commands that, when executed by the at least one processor, cause the data processing device to:

calculate, from the indicator swarm data, a minimum indicator swarm distance between the at least two roadway or lane indicators at one or more route section positions of the route section;

obtain expanded indicator swarm data by adding to the indicator swarm data a lane width value corresponding to the minimum indicator swarm distance at the one or more route section positions of the route section, wherein, for each route section position of the one or more route section positions of the route section, the expanded indicator swarm data includes an identifier of the route section position and the lane width value corresponding to the minimum indicator swarm distance between the at least two roadway or lane indicators calculated for the route section position; and provide the expanded indicator swarm data to the driver assist system of the motor vehicle, wherein the driver assist system controls the motor vehicle based on the lane width value corresponding to the minimum indicator swarm distance between the at least two roadway or lane indicators calculated for at least one of the one or more route section positions included in the expanded indicator swarm data.

6. A driver assist system including the data processing device according to claim 5.

7. A motor vehicle including the data processing device according to claim 5, wherein the commands, when executed by the at least one processor, cause the data processing device to register roadway or lane indicator data.

8. A non-transitory computer-readable storage medium storing commands that, when executed by at least one processor, cause a data processing device, to:

obtain swarm data for controlling a motor vehicle by way of a driver assist system, wherein the swarm data for a route section of a road include corresponding indicator swarm data regarding a course of at least two roadway or lane indicators on the route section, and wherein the swarm data are provided by registered roadway or lane indicator data, calculate, from the indicator swarm data, a minimum indicator swarm distance between the at least two roadway or lane indicators at one or more route section positions of the route section;

obtain expanded indicator swarm data by adding to the indicator swarm data a lane width value corresponding to the minimum indicator swarm distance at the one or more route section positions of the route section, wherein, for each route section position of the one or more route section positions of the route section, the expanded indicator swarm data includes an identifier of the route section position and the lane width value corresponding to the minimum indicator swarm distance between the at least two roadway or lane indicators calculated for the route section position; and provide the expanded indicator swarm data to the driver assist system of the motor vehicle, wherein the driver assist system controls the motor vehicle based on the lane width value corresponding to the minimum indicator swarm distance between the at least two roadway or lane indicators calculated for at least one of the one or more route section positions included in the expanded indicator swarm data.

9. The data processing device according to claim 5, wherein the minimum indicator swarm distance at the one or more route section positions relates to adjacent roadway or lane indicators or an outermost roadway or lane indicator and the roadway or lane indicator located closest to the adjacent roadway or lane indicators or the outermost roadway.

* * * * *